Figure 1:
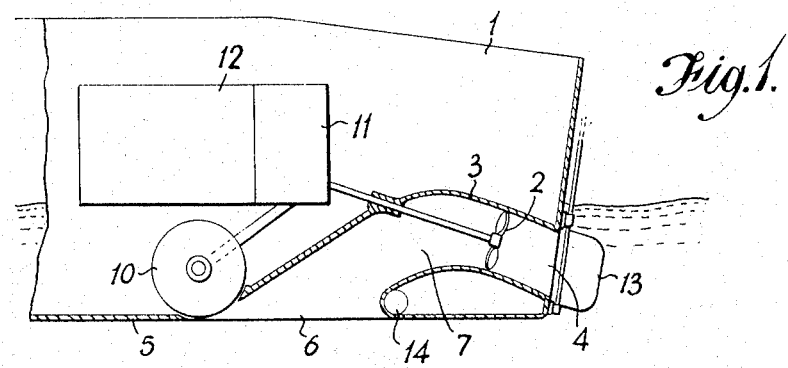

Aug. 2, 1966  E. G. TATTERSALL  3,263,643
VEHICLES OPERABLE OVER WATER
Filed Oct. 27, 1964

INVENTOR
E. G. TATTERSALL
BY
Cameron, Kerkam & Sutton
ATTORNEYS

United States Patent Office 3,263,643
Patented August 2, 1966

3,263,643
VEHICLES OPERABLE OVER WATER
Edward Gunston Tattersall, Hythe, Southampton, England, assignor to Hovercraft Development Limited, London, England, a British company
Filed Oct. 27, 1964, Ser. No. 406,704
Claims priority, application Great Britain, Oct. 28, 1963, 42,461/63
12 Claims. (Cl. 115—1)

This invention relates to vehicles operable over water and propelled thereover by systems which operate by taking in water, energising it and then expelling it. Examples of such propulsion systems include the ducted propeller and so-called "water jet propulsion" systems, and in particular relates to the water intakes of such propulsion systems.

In such propulsion systems, if the water intake comprises a scoop projecting down from the vehicle and into the water, drag forces of considerable magnitude are imparted to the vehicle. A further disadvantage of the scoop form of water intake is its susceptibility to damage by collision with water-borne debris.

A flush intake can be used, that is, a water intake the opening of which is substantially level with the surface of the vehicle, but, unless external, water-deflecting vanes are employed (and these vanes automatically introduce large drag penalities) flow of water into the intake must be induced by the propulsion means. These propulsion means comprise, for example, a propeller in the ducted propeller propulsion system or an impeller in the water-jet propulsion system.

Unfortunately, when the flow of water is induced into the intake by the propulsion means, deflection of the water flow must be induced by the propulsion means and deflection of the water from its original flow path results in turbulence at the leading edge of the intake inside the duct which it feeds and this turbulence causes inefficiency in the propulsion system.

The propulsion systems described above can be applied to the propulsion of gas-cushion supported vehicles and particularly to such vehicles which have longitudinal sidewalls depending below the bottom of the main body of the vehicle, the lower parts of the side-walls dipping into the water. In this particular application, an impeller of the system may be positioned in the top part of a side-wall or in the main body of the vehicle, the water intake being formed in the lower, immersed part of the side-wall. Again, intake conditions are likely to result in an inefficient propulsion system unless water deflector vanes or the like are provided, and at the high speeds at which such vehicles are intended to operate, considerable drag forces will be created by these vanes.

According to the invention there is provided a propulsion system for a vehicle operable over water, the system being of the type comprising propulsion means fed with water by way of an intake opening disposed below the operating water level of the vehicle, and in a plane substantially parallel to the flow-path of the water past the vehicle in the vicinity of the opening, at least part of an edge of the opening transverse to the flow of water past the vehicle is formed by a surface movable continuously relative to the remainder of the intake and in the same general direction as the flow of water into the intake.

A transverse edge of the intake opening can be either the leading or trailing edge of the opening as a loss of efficiency similar to that described above in relation to the leading edge of the intake also occurs in a propulsion system at starting and low speeds because of turbulence at the rear edge of the intake inside the duct. This turbulence can be at least reduced by providing the rear or trailing edge of the intake with a movable surface also.

In their simplest forms, the movable surfaces of the intake opening are provided by peripheral parts of cylinders or wheels.

Figure 2:
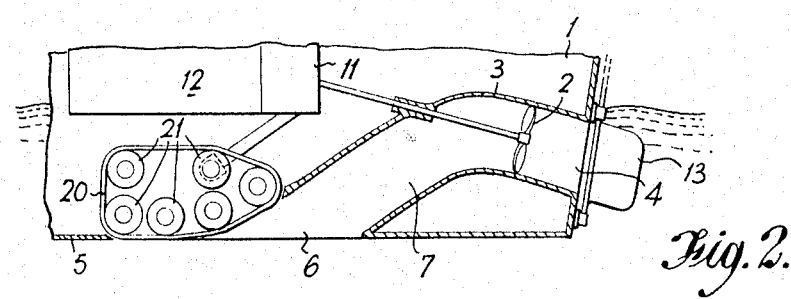
Figure 3:
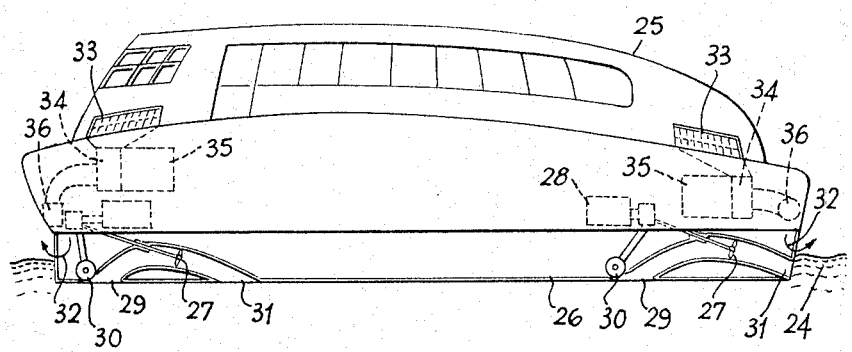

The invention will be readily understood by the following description of two embodiments of the invention, by way of example, in conjunction with the accompanying drawings in which:

FIGURE 1 is a vertical cross-section through the first embodiment of the invention, FIGURE 2 illustrates a modification of the embodiment illustrated in FIGURE 1, and FIGURE 3 illustrates the second embodiment, being the application of the invention to a gas-cushion supported vehicle, the lower part being in section.

FIGURE 1 shows the rear part of a boat hull 1. Propulsion means in the form of an impeller 2 of a water jet propulsion system is positioned in a housing 3 of circular cross-section, the housing 3 ending in a propulsion outlet 4. Formed in the bottom surface 5 of the hull 1, is a flush-fitting intake opening 6, and an inclined duct 7 connects the intake opening 6 with the housing 3. The intake opening 6 is disposed in a plane substantially parallel to the flow of water past the vehicle 1 in the vicinity of the opening. Water is drawn in through the intake opening 6 by the impeller 2. Without the provision of the invention, the water, as it flows into the intake, would break away from the forward wall of the duct 7, creating a turbulence which severely interferes with the efficiency of the propulsion system.

In FIGURE 1, the leading transverse edge of the intake opening is formed by a peripheral part of the surface of a rotatable cylinder 10, horizontally disposed, the axis of which lies athwartships, i.e. normal to the flow of water past the vehicle 1. The cylinder 10 may rotate about its axis under the action of the water flowing into the intake 6, in which case some increase in efficiency of the intake will occur, but preferably the cylinder is power driven, for example from the gear box 11 attached to the engine 12, which also drives the impeller 2. Alternatively, the cylinder 10 may be driven from a separate power source. The cylinder 10 may be rotated at a variety of speeds, but conveniently is rotated at a speed which will produce a peripheral speed at or slightly above the speed of the boat hull relative to the water.

The intake opening 6 will normally be square or rectangular in plan, form the cross-section of the duct 7 varying from the shape of the intake opening to a circular shape where it connects to the housing 3. One or more rudders 13, are positioned adjacent to the outlet 4 in the path of the water leaving the outlet. Alternatively, the outlet 4 can be made movable relative to the boat hull 1 in a known manner.

The rear or trailing transverse edge of the intake opening 6 may be formed by a peripheral part of a rotatable cylinder 14. Normally, when the boat is stationary or moving very slowly, the induction of water into the intake opening 6 results in turbulence which interferes with the efficiency of the propulsion system. The cylinder 14 is rotated, for example by driving it from the gear box 11, at starting and low speeds and this rotation reduces the turbulence. The cylinder 14 is not normally rotated when the vehicle is travelling at its cruising speed or higher speeds.

Instead of using cylinders, the edges of the intake opening 6 can be formed by other forms of moving surface. FIGURE 2 illustrates a modification of FIGURE 1 in which a section of a continuous belt 20 is provided for forming the leading edge of the intake opening. The belt moves round on rollers 21, one or more of which can be driven from the gear box 11. In this example the rear edge of the intake opening is not movable.

FIGURE 3 illustrates the application of the invention to a vehicle 25 of the type which is supported above the water 24 by one or more cushions of pressurised gas, the cushion or cushions being contained along the sides of the vehicle by longitudinal side walls 26 depending below the bottom of the main body of the vehicle, and at the front and rear by curtains 32 of moving fluid. The curtain fluid is air drawn in through intakes 33 by compressors 34 driven by engines 35, the air after pressurisation being fed to ducts 36 which supply the curtain nozzles.

The walls 26 taper in vertical cross-section, being thicker at the top than at the botttom, and thus provide sufficient room for impellers 27 to be positioned in the top of the wall. It is more convenient to position the impellers 27 as high as possible to ease the problem of connecting the impellers to the engines 28. It is necessary to position the flush-fitting intake openings 29 as low as possible, as although the lower parts of the side walls 26 are normally always immersed, the water level on the inside of the walls is lower than that on the outside, the water being displaced by the pressure of the gaseous cushion or cushions. Again, when the vehicle is travelling over waves, the degree of immersion of the side walls will vary.

The leading edges of the intake opeinings 29 are formed by peripheral parts of cylinders 30 as in FIGURE 1, but alternative forms of continuously moving surfaces can be used. As shown, propulsion means can be provided at both ends of the vehicle, if desired. By providing rudders in the form of movable vanes in the outlets 31, or by making the outlets 31 movable relative to the wall 26 with which they are associated, manoeuvering thrust can be provided, for steering the vehicle 25, for rotating the vehicle about its vertical centre line, or for moving it side-ways. If desired, the rear edges of the intake openings 29 can be formed by continuously movable surfaces also.

A subsidiary feature of providing cylinders 30, or other movable surfaces, at each end of each side wall is that by making the bottom edge of each side wall of flexible material, the cylinders can be used as wheels to give some degree of amphibious operation, in particular for docking or the like.

Where cylinders or like structures are used to provide the movable surfaces the structures may be of rigid construction or may alternatively be of inflated form, preferably constructed from a flexible material.

I claim:

1. A propulsion system for a vehicle operable over water, the system being of the type comprising propulsion means fed with water by way of an intake opening disposed below the operating water level of the vehicle and in a plane substantially parallel to the flow of water past the vehicle in the vicinity of the opening, at least part of an edge of the opening transverse to the flow of water past the vehicle being formed by a surface movable continuously in the same general direction as the flow of water into the intake.

2. A system as claimed in claim 1 wherein the surface is formed by part of the periphery of a cylinder disposed so that its axis lies in a plane substantially parallel to the plane of said opening and normal to the flow of water past the vehicle, the cylinder being rotatable about said axis.

3. A system as claimed in claim 1 wherein the surface is formed by part of a continuous belt movable in a plane substantially normal to the plane of said opening.

4. A system as claimed in claim 1 wherein the surface is part of an inflatable structure.

5. A system as claimed in claim 1 wherein the surface is part of a structure movable relative to the vehicle.

6. A vehicle intended for operation over water, and which, in operation, is supported above the surface of water by at least one cushion of pressurised gas formed and contained beneath the vehicle and provided with a propulsion system according to claim 1.

7. A vehicle intended for operation over water, and which, in operation, is supported above the surface of water by at least one cushion of pressurised gas formed and contained beneath the vehicle, the cushion being bounded along the fore and aft sides of its periphery by longitudinal side walls arranged to extend below the surface of the water, and provided with a propulsion system according to claim 1.

8. A vehicle as claimed in claim 7 wherein the system is housed in one of said side walls.

9. A vehicle as claimed in claim 8 wherein the propulsion means are disposed in the upper region of said side wall.

10. A vehicle as claimed in claim 1 wherein said surface can be employed to convey the vehicle over land surfaces.

11. A vehicle as claimed in claim 1 wherein the propulsion means comprise an impeller said impeller being driven by the same power source that moves said surface.

12. A vehicle as claimed in claim 1 wherein said surface is inflatable.

No references cited.

MILTON BUCHLER, *Primary Examiner.*

A. H. FARRELL, *Assistant Examiner.*